H. SPEETJENS

Oct. 4, 1932. APPARATUS FOR PERMANENTLY WAVING THE HAIR Re. 18,614

Original Filed April 20, 1922

Inventor

Hubert Speetjens

By H. R. Wilson & Co

Attorneys

Reissued Oct. 4, 1932

Re. 18,614

UNITED STATES PATENT OFFICE

HUBERT SPEETJENS, OF LONDON, ENGLAND, ASSIGNOR TO ARTHUR HAROLD STEVENS, OF LONDON, ENGLAND

APPARATUS FOR PERMANENTLY WAVING THE HAIR

Original No. 1,504,988, dated August 12, 1924, Serial No. 555,720, filed April 20, 1922. Application for reissue filed August 18, 1932. Serial No. 629,390.

This invention relates to electrically heated apparatus for permanently waving the hair, and is an improvement in apparatus of the type comprising a curler or former upon which the hair is tightly coiled, and a tubular electric heater consisting of a tube on which the electric heating wire is wound and an outer enclosing sleeve or casing. In the practice of the art of hair waving, it has been found advantageous to be able to regulate the heat applied to the coiled tress or portion of hair on the curler, in order to obtain the greatest heating effect near the roots of the hair and avoid excessive heating, more especially at the outer end of the tress where the hair is naturally thinner and more liable to injury from overheating.

Now according to this invention, the tubular electric heating element is formed preferably adjacent that end which in use is more remote from the roots of the hair, with vent holes, or cooling apertures, or slots capable of being regulated by a rotary or adjustable sleeve or shutter to allow some of the moist heat or steam to escape, the vented part of the element being preferably of larger diameter internally than the non-vented part upon which the insulated heating wire is wound.

In the accompanying sheet of illustrative drawings.

Figure 1:
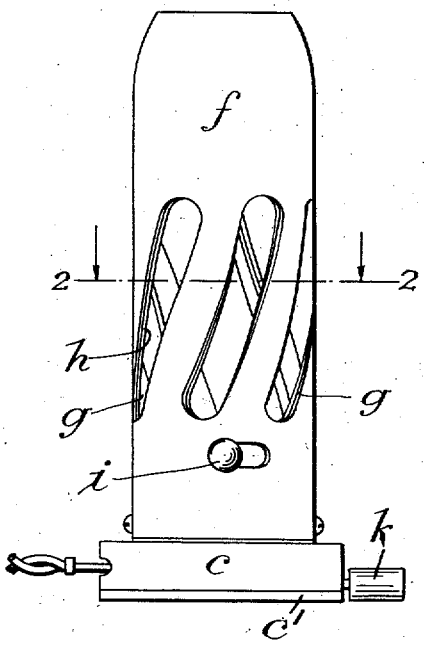
Fig. 1 is an elevation of an electric heater constructed according to this invention.
Figure 3:
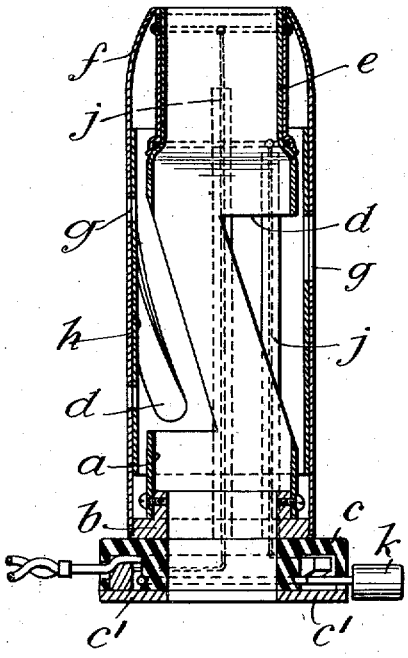
Fig. 3 is a longitudinal section taken at 3—3 Fig. 2.
Figure 2:
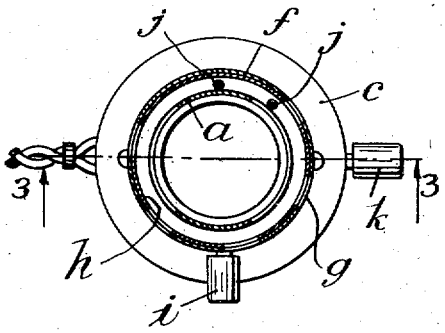
Fig. 2 is a transverse section of the same taken at 2—2 Fig. 1.
Figure 4:
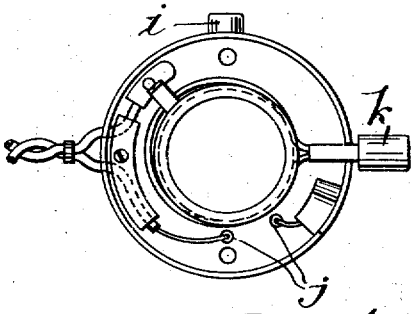
Fig. 4 is an inverted plan with a part removed.

As shown the tubular heating element consists of an inner tube *a* which is made of brass or other suitable material and fixed to a flanged metal ring *b* at one end, to which an annular end piece *c* of insulating material is attached. Parts of the tube *a* are cut away as shown at *d* or the tube may be perforated with annular rows of holes while the heating wire coil is applied at *e* to an uncut or imperforate part of the tube of smaller diameter remote from the handle. An annular space is formed in the part *c* for the reception of a switch, and is closed by a cover ring or plate *c'*.

Over the inner tube *a* and heating coil is placed an aluminium tube or sleeve *f* which is contracted at one end and formed with a series of helical slots *g*, the outer tube or sleeve *f* being fixed to the flange of the ring *b*.

Between the slotted parts of the outer tube *f* and the inner tube *a* a slotted shutter or sleeve *h* is interposed, which is capable of being partially rotated by a handle *i* to open or close the vent apertures or slots *g* or regulate them as required. It will be understood that the vent apertures *g* are not necessarily in the form of slots and that they may take other convenient shapes.

In the permanent hair waving process to which the invention is applicable, the tress of hair when coiled on the curler is wrapped in a cloth or flannel strip moistened with a suitable solution, and over which a cardboard tube is placed. The whole is then inserted in the tubular heating element, the venting of which can be regulated as described by manipulating the movable sleeve or shutter. The connections to the heating coil are led through the annular end piece *c* and through insulating tubes *j*, a switch *k* being interposed to open and close the circuit.

I claim:

1. A tubular electric heater for hair waving formed with venting apertures or slots capable of being regulated by an adjustable sleeve or shutter.

2. A tubular electric heater for hair waving comprising an inner tube, an outer tube positioned about said inner tube, said tubes having venting apertures and shutter means between the inner and outer tubes for controlling the apertures of the outer tube.

3. A tubular electric heater for hair waving comprising an inner tube, an outer tube positioned about the inner tube in spaced relation thereto, and a heating coil positioned only about one end portion of said inner tube.

4. A tubular electric heater for hair waving comprising an inner tube, an outer tube positioned about the inner tube in spaced relation thereto, and a heating coil positioned only about one end portion of said inner tube, the remaining portion of the inner tube and the outer tube being provided with venting apertures, and shutter means for controlling the apertures of the outer tube.

5. A tubular electric heater for hair waving comprising electrical means for heating a tress of hair, a member formed with venting apertures or slots for cooling the tress, and a sleeve or shutter adjustable to regulate said apertures or slots for controlling the cooling action thereof.

6. A tubular electric heater for hair waving comprising electrical means for heating a tress of hair, a member formed with venting apertures or slots for cooling the tress, and a sleeve or shutter adjustable by rotary movement to regulate said apertures or slots for controlling the cooling action thereof.

7. A tubular electric heater for hair waving comprising an electrically-heated tubular portion for heating a tress of hair near the roots, a portion formed with venting apertures or slots for cooling the outer ends of the tress, and a sleeve or shutter adjustable to regulate the venting action of said apertures.

8. A tubular electric heater for hair waving comprising an electrically-heated tubular member for heating a tress of hair near the roots thereof, means for conducting heat from said heated tubular member to the outer ends of the tress, said means including a plurality of venting apertures or slots, and a sleeve or shutter adjustably movable relatively to the apertures or slots for regulating the venting action thereof.

9. A tubular electric heater for hair waving comprising an electrically-heated tube for encasing a tress of hair, a tubular heat-conducting member in axial alinement with said tube and having venting apertures or slots formed therein, and a sleeve or shutter adjustable by rotary movement relative to said apertures or slots to regulate the venting action thereof.

10. A tubular electric heater for hair waving comprising an electrically-heated tube for encasing a coiled tress of hair adjacent the root ends thereof, a plurality of heat-conducting members disposed about the outer end of the tress to form a substantially tubular framework in axial alinement with the electrically-heated tube, the spaces between said heat-conducting members forming longitudinally-disposed venting apertures or slots, and a sleeve or shutter adjustable by movement relative to said apertures or slots to regulate the venting action thereof.

In testimony whereof he has affixed his signature.

HUBERT SPEETJENS.